United States Patent
Imam et al.

(10) Patent No.: US 8,008,242 B1
(45) Date of Patent: Aug. 30, 2011

(54) BIODEGRADABLE ABRASIVE COMPOSITIONS

(75) Inventors: Syed H. Imam, Walnut Creek, CA (US); Gregory M. Glenn, American Canyon, CA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 12/538,493

(22) Filed: Aug. 10, 2009

(51) Int. Cl.
*D04H 1/00* (2006.01)
(52) U.S. Cl. .................................. 510/395; 422/416
(58) Field of Classification Search .................. 510/395; 422/416
See application file for complete search history.

(56) References Cited

U.S. PATENT DOCUMENTS

| | | | |
|---|---|---|---|
| 2,733,138 A | 1/1956 | Clark | |
| 4,016,117 A | 4/1977 | Griffin | |
| 5,354,621 A | 10/1994 | Liebermann | |
| 5,905,046 A * | 5/1999 | Takeda et al. | 442/416 |
| 7,262,157 B2 * | 8/2007 | Utz et al. | 510/121 |
| 2006/0159729 A1 * | 7/2006 | Helfman et al. | 424/443 |
| 2008/0031842 A1 * | 2/2008 | Kuhlman et al. | 424/70.11 |
| 2008/0221246 A1 | 9/2008 | Imam et al. | |

* cited by examiner

*Primary Examiner* — Milton I Cano
*Assistant Examiner* — M. Reza Asdjodi
(74) *Attorney, Agent, or Firm* — John D. Fado; Robert D. Jones

(57) ABSTRACT

The biodegradable abrasive compositions consist of a plant-based natural abrasive agent, calcium carbonate, polymeric material, and a binder. The natural abrasives may consist of a plant-based cereal grains or fibers. The polymeric materials of the preferred embodiments include starch and poly-vinyl alcohol, either alone or in combination. The products associated with the biodegradable abrasive compositions are gently abrasive and readily disposable films or coatings. The products are designed to maximize the use of agricultural bi-products and avoid harm the environment.

22 Claims, 1 Drawing Sheet

BIODEGRADABLE ABRASIVE COMPOSITIONS

FIELD OF THE INVENTION

The current invention relates to biodegradable compositions that incorporate natural fibers.

BACKGROUND OF THE INVENTION

There are multiple commercially-available personal and general purpose cleansers that incorporate abrasive materials to facilitate the cleansing process. These cleansers are generally petroleum-based and use pumice, sand, metal meshes, foams, rigid and textured plastics, and various composites as abrasive materials. Although these materials are effective, they are often too harsh for use in sensitive or soft areas. Further, many of the abrasives and their associated adhesives are not biodegradable so they remain in the plumbing and in the water system long after their use.

Similar concerns are associated with single-use products such as wet-wipes, scouring pads, disposable cleaning heads, and the like. These products either do not biodegrade, or they biodegrade very slowly. These types of products typically end up in the household trash where they harbor germs, and create undesirable odors. Ultimately, the products add to the non-biodegradable bulk waste in landfills.

The need exists for abrasive products that are gentler and more readily disposable than most currently available products. The current invention comprises gently abrasive natural coatings and films that incorporate agricultural fibers and grains. These fibers include wheat straw, rice straw, and other fibers that are bi-products of various agricultural processes. The grains used in products associated with the current invention may include corn, wheat, sorghum, rice, oats, barley; soy meal and puffed starch beads.

Unlike existing cleansers, the products associated with the current invention are biodegradable and are developed from naturally renewable materials. Further, the films and coatings associated with the current invention are generally "flushable" in conventional toilets. The current invention utilizes starch from various surplus crops, and agricultural fibers having little or no economic value. This is particularly important because there are limitations on burning or otherwise disposing of these fibers. Finding new uses for surplus crops and low-value residues will improve the rural economy and directly benefit American Farmers.

SUMMARY OF THE INVENTION

The current invention is directed to a biodegradable composition that incorporates natural abrasives. Specifically, the composition comprises a plant-based natural abrasive agent, calcium carbonate, polymeric material, and a binder. In the preferred embodiments, the composition is embodied as a film or coating.

When a product associated with the invention is used by a consumer, the composition is moistened and physically abraded or rubbed. After the moistening and abrading process, the composition starts to soften. If additives are present, the additives may be released to enhance the effectiveness of the product. The composition then begins to shrink considerably in size, and eventually biodegrades.

The current invention is also directed to a process of making a biodegradable composition. Polymeric materials and binders are combined with water so that the polymeric materials and binders are suspended in the resulting mixture. The mixture is then heated to 70-80° C. to achieve a complete dissolution, and the plant-based abrasive and calcium carbonate are added to the formulation. Other additives may also be included. The formulation is then mixed and blended to the desired degree of homogeneity and allowed to cool to room temperature.

DETAILED DESCRIPTION OF PREFERRED EMBODIMENTS

Figure 1:
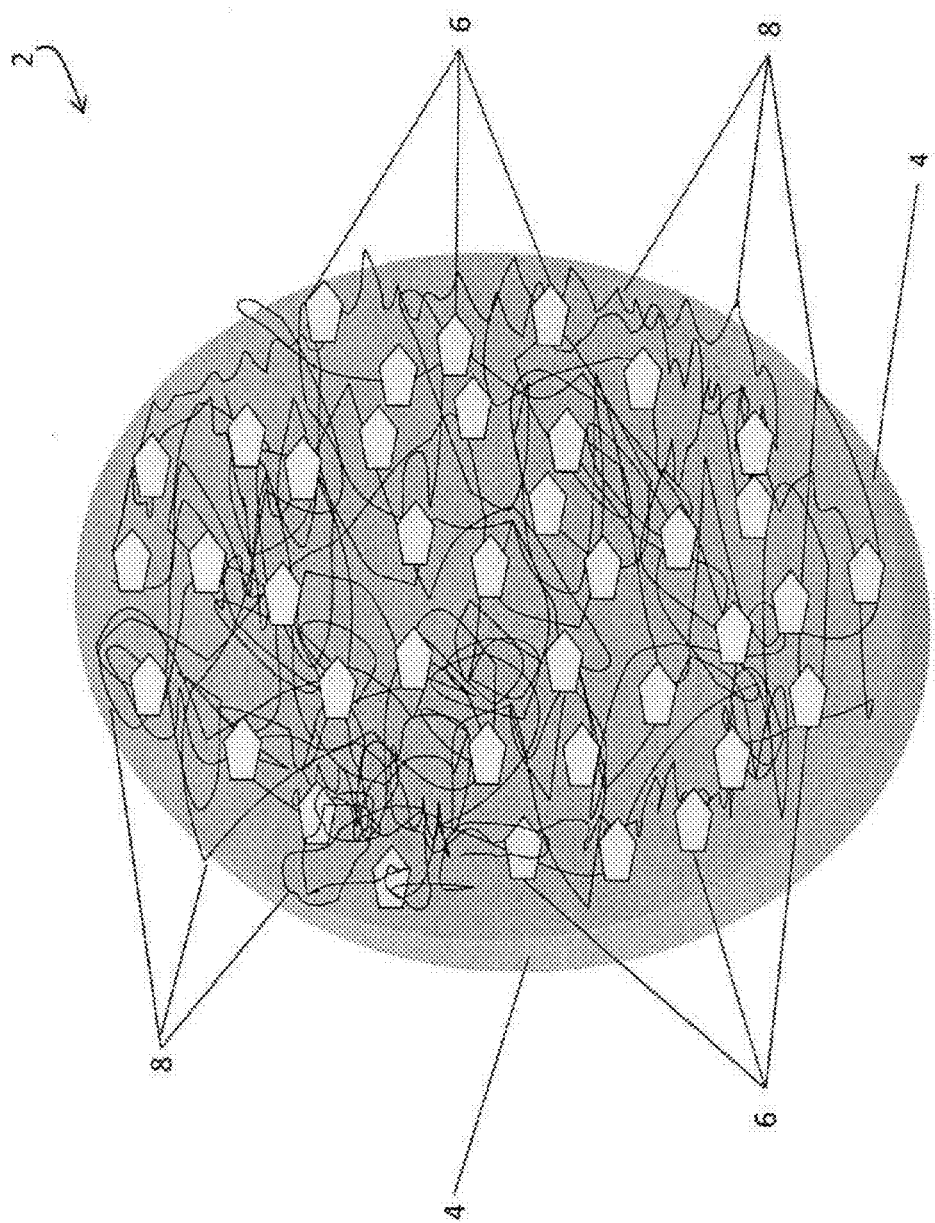
FIG. 1 is depiction of the coating embodiment of the current invention.

The current invention is directed to an abrasive and biodegradable composition comprising a polymeric material, a binder, a plant-based natural abrasive agent, and calcium carbonate.

In the preferred embodiments, the composition is embodied as a film or coating. In alternative embodiments, the composition may be embodied in a more or less substantial form. For the purposes of this specification, a "film" is a relatively thin sheet comprising a stand-alone product. A film comprises the ingredients of a composition independent of any substrate. The film embodiment of the current composition is completely biodegradable, water soluble, and "flushable" in conventional toilets.

For the purposes of this specification, a "coating" is a relatively thin layer of a composition usually associated with a substrate. A coating is generally applied to a substrate to create a product. The coating of the current invention binds strongly to both natural and synthetic surfaces and may be applied to a variety of biodegradable and non-biodegradable substrates to create a product.

FIG. 1 shows the coating embodiment of the current invention. As shown in FIG. 1, the coating composition 2 is applied to a substrate 4. The composition 2 comprises a binder that anchors natural fibers and/or grains 6 to a polymer matrix 8. The film embodiment of the invention is essentially similar to the coating embodiment, less the presence of a substrate.

Materials:

The material components of the current composition are shown in Table 1. Characteristics of the components shown in Table 1 are described in Table 2:

TABLE 1

| | |
|---|---|
| POLYMERIC MATERIALS | Starch, modified starch, poly-vinyl alcohol, soy meal, puffed starch beads, 1-4, polyisoprene, chitosan, and pectin |
| FIBER TYPE | Rice straw, wheat straw, corn fiber, rice husk, pulp paper, |
| BINDERS | Alginates, guar gum, gum arabic, oats, barley, sorghum |
| CEREAL GRAINS | Ground corn, cracked wheat, ground soy |

TABLE 2

| | |
|---|---|
| POLYMER CONCENTRATION | Ranged between 3-10% (dry wt. basis) |
| FIBER SIZE | 100 μm-250 μm |
| BINDERS CONCENTRATION | 0.1-.2.0% by weight |
| CEREAL GRAIN SIZE | 0.1-3 mm |

In the preferred embodiment, the polymeric material comprises starch or polyvinyl alcohol. The polymeric material may also comprise modified starch, soy meal, puffed starch beads, 1-4, polyisoprene, chitosan, and pectin (see Table 1). These polymeric materials may be used alone or in combination with the other polymeric materials shown in Table 1. In alternative embodiments, other similarly suited polymeric materials should be considered within the scope of the invention.

The term "starch" (as used in the current specification) refers to polymers containing amylose, amylopectin, the naturally-occurring starch molecules that are found in plants such as corn, potato, rice barley, wheat, oats, triticale, rye, sorghum, root and tuber starch, such as potato, tapioca (also known as Cassava) yam, sweet potato and Canna starch as well as modified starch. Examples of modified starch include starch that has been modified through partial hydrolysis, cross-linking, substitution, dextrinization, etc. Examples of intermediates of starch hydrolysis include but are not limited to dextrin, maltodextrin, corn syrup, etc.

The current composition also includes a binder. Suitable binders include alginates, guar gum, gum arabic, oats, barley, sorghum (see Table 1). These binders may be used either alone or in combination with the other binders shown in Table 1. In alternative embodiments, other binders should be considered within the scope of the invention.

The current composition further includes cereal grains and agricultural fibers (see Table 1). Suitable agricultural fibers include rice straw, wheat straw, corn fiber, rice husk, and pulp paper. Suitable cereal grains include ground corn, cracked wheat, and ground soy. The grains and fibers may be used either alone or in combination with the other cereals and fibers listed in Table 1. In the preferred embodiments, the fiber size should be limited to 100 μm-250 μm, and the cereal grain size should be limited to 0.1-3 mm (see Table 2). In alternative embodiments, other cereal grains and fibers in any size should be considered within the scope of the invention.

Method of Preparation:

The current composition is prepared through a multi-step process. Polymeric material and binders are suspended in water and heated (between 70-80° C.) to achieve a complete dissolution. Fiber and/or grains are added and the solution is stirred gently. Depending on the nature of the desired product, other additives (listed infra) may be included as needed. As additional ingredients are added, the solution is stirred or mixed to produce the desired amount of homogeneity.

The resulting formulation has a binder concentration is 0.1-2% (by weight) and the polymeric materials comprise 3-10% (dry weight basis) of the formulation. In the preferred embodiments, fiber and cereal grain sizes are also limited (see Table 2).

In the coating embodiment, the mixture is either applied directly on a substrate (e.g. a sponge, paper, cloth or the like) by a brush, roller, or other direct applicator, or the coating is sprayed or poured on the substrate. Preferably the coating has a final thickness of approximately 0.1 mm-3 mm. In the film embodiment, films of about 50-500 μm in thickness may be cast by any means known in the art.

The resulting films and coated surfaces may be air dried at room temperature or in an oven at 40° C. to expedite the drying process. Upon drying, the fiber and grains of the composition are exposed but firmly anchored or embedded in the film matrix (See FIG. 1). The process of the current invention is similar but patentably distinct from the process of the inventor's previously-filed application (application Ser. No. 11/716,434, US Patent Application Publication No. US 2008/0221246), which is herein incorporated by reference.

In alternative embodiments, various additives may be added to the composition during formulation. The additives may include various cleansing agents and facilitators as well as other additives to enhance the function of the product. Specifically, additives may include but are not limited to colors, detergents, fragrances, minerals, oils, inorganic clays, alcohols, silic acid, talc, salts, and microfibrils. Further additives may be used to impart additional desired properties to the composition.

In operation, after the composition has been moistened and physically abraded or rubbed, the composition starts to soften. If additives are present, the additives may be released to enhance the effectiveness of an associated product. The composition then begins to shrink considerably in size, and eventually biodegrade.

Among other uses, the coating embodiment of the current composition may be applied to a substrate (such as foam, a sponge, or other moisture-retaining media) and used as a bathroom, kitchen, or general purpose cleanser. The coating may also be modified and used as a gentle and natural skin or facial cleanser. The film embodiment of the current invention may be used for these purposes as well.

For the foregoing reasons, it is clear that the invention provides an innovative method and composition that may be used in multiple product applications. The invention may be modified in multiple ways and applied in various technological applications. The current invention may be modified and customized as required by a specific operation or application, and the individual components may be modified and defined, as required, to achieve the desired result. Although some of the materials of construction are not described in detail, they may include a variety of compositions consistent with the function of the invention. Such variations are not to be regarded as a departure from the spirit and scope of the invention, and all such modifications as would be obvious to one skilled in the art are intended to be included within the scope of the following claims.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error in their respective measurement.

What is claimed is:

1. A plant based biodegradable coating consisting essentially of a cereal-based abrasive agent, calcium carbonate, polymeric material, a cleansing additive and a binder.

2. The coating of claim 1 wherein the polymeric material comprises starch.

3. The coating of claim 1 wherein the polymeric material comprises poly-vinyl alcohol.

4. The coating of claim 1 wherein the polymeric material comprises a combination of starch and poly-vinyl alcohol.

5. The coating of claim 1 wherein the polymeric material is selected from a group consisting of modified starch, soy meal, puffed starch beads, 1-4, polyisoprene, chitosan and pectin.

6. The coating of claim 1 wherein the concentration of polymeric material is in the range of three to ten percent based on dry weight.

7. The coating of claim 1 wherein the coating is water-soluble.

8. The coating of claim 1 wherein the binder anchors the abrasive agent to the polymeric material.

9. The coating of claim 1 wherein the binder is selected from a group consisting of alginates, guar gum, gum arabic, oats, barley, and sorghum.

10. The coating of claim 1 wherein the binder is in the range of 0.1-2% by weight.

11. The coating of claim 1 wherein the cereal plant-based abrasive agent comprises at least one cellulosic fiber.

12. The coating of claim 11 wherein the fiber size is in the range of 100 µm-250 µm.

13. The coating of claim 1 wherein the cereal-based abrasive agent is selected from a group consisting of rice straw, wheat straw, corn fiber, rice husk, and pulp paper.

14. The coating of claim 1 wherein the cereal grain size is in the range of 0.1-3 mm.

15. The coating of claim 1 wherein the cereal-based abrasive material is selected from a group consisting of ground corn, cracked wheat, and soy.

16. The coating of claim 1 further comprising additives selected for the group consisting of colors, detergents, fragrances, minerals, oils, inorganic clays, alcohols, silic acid, talc, salts, and microfibrils.

17. The coating of claim 1 wherein the coating is applied to a substrate so that the combination of the coating and the substrate comprise a cleaning product.

18. A plant based biodegradable coating consisting essentially of a cereal-based abrasive agent, calcium carbonate, polymeric material, and a binder, and further comprising a cleansing additive.

19. The film of claim 18 wherein the film is completely biodegradable.

20. The film of claim 18 wherein the film comprises a cleaning product.

21. A plant based biodegradable coating consisting essentially of plant-based abrasive agent comprising at least one cellulosic fiber, calcium carbonate, polymeric material, a cleansing additive and a binder.

22. The coating of claim 21 wherein the coating is applied to a substrate so that the combination of the coating and the substrate comprise a cleaning product.

* * * * *